United States Patent
Suwa

(10) Patent No.: US 7,652,691 B2
(45) Date of Patent: Jan. 26, 2010

(54) IMAGING APPARATUS, CONTROL METHOD THEREOF, AND IMAGING SYSTEM FOR PERFORMING APPROPRIATE IMAGE CAPTURING WHEN A DRIVING METHOD IS CHANGED

(75) Inventor: Takeshi Suwa, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 445 days.

(21) Appl. No.: 11/767,363

(22) Filed: Jun. 22, 2007

(65) Prior Publication Data

US 2008/0002038 A1    Jan. 3, 2008

(30) Foreign Application Priority Data

Jul. 3, 2006    (JP) .............................. 2006-183847

(51) Int. Cl.
*H04N 5/235* (2006.01)
*G03B 7/00* (2006.01)

(52) U.S. Cl. ..................................... 348/230.1; 348/362
(58) Field of Classification Search ........................ None
See application file for complete search history.

(56) References Cited

U.S. PATENT DOCUMENTS 6,947,082 B2    9/2005    Gomi

2007/0098386 A1    5/2007    Yoneda

FOREIGN PATENT DOCUMENTS

| JP | 9-163236 A | 6/1997 |
|---|---|---|
| JP | 10-013735 A | 1/1998 |
| JP | 11-196335 A | 7/1999 |
| JP | 2002-330329 A | 11/2002 |
| JP | 2004-274284 A | 9/2004 |
| JP | 2005-094142 A | 4/2005 |
| JP | 2006-129237 A | 5/2006 |

*Primary Examiner*—Justin P Misleh
(74) *Attorney, Agent, or Firm*—Canon U.S.A., Inc. I.P. Division

(57) ABSTRACT

An imaging apparatus includes a control unit which has a first mode in which image signals are read out successively from every predetermined line of a first photoelectric conversion element group arranged in a first region of an imaging plane; and a second mode in which image signals are read out successively from every predetermined line of a second photoelectric conversion element group arranged in a second region which is different from the first region of the imaging plane. In addition, the control unit performs control so as to cause a period from starting readout of the signal of the predetermined line to starting next readout of the signal of the predetermined line in the first mode to be the same as that from starting readout of the signal of the predetermined line to starting next readout of the signal in the second mode.

10 Claims, 12 Drawing Sheets

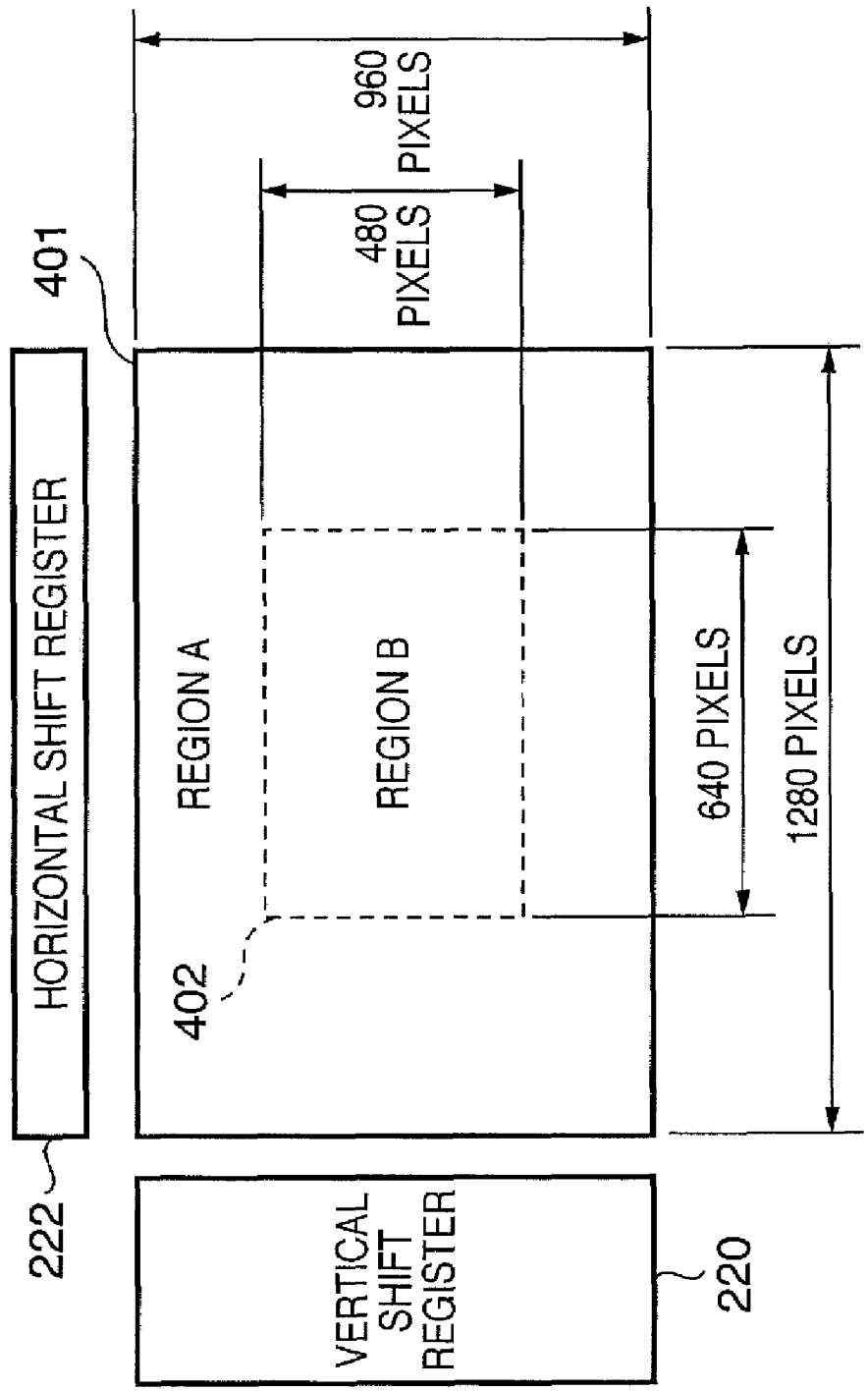

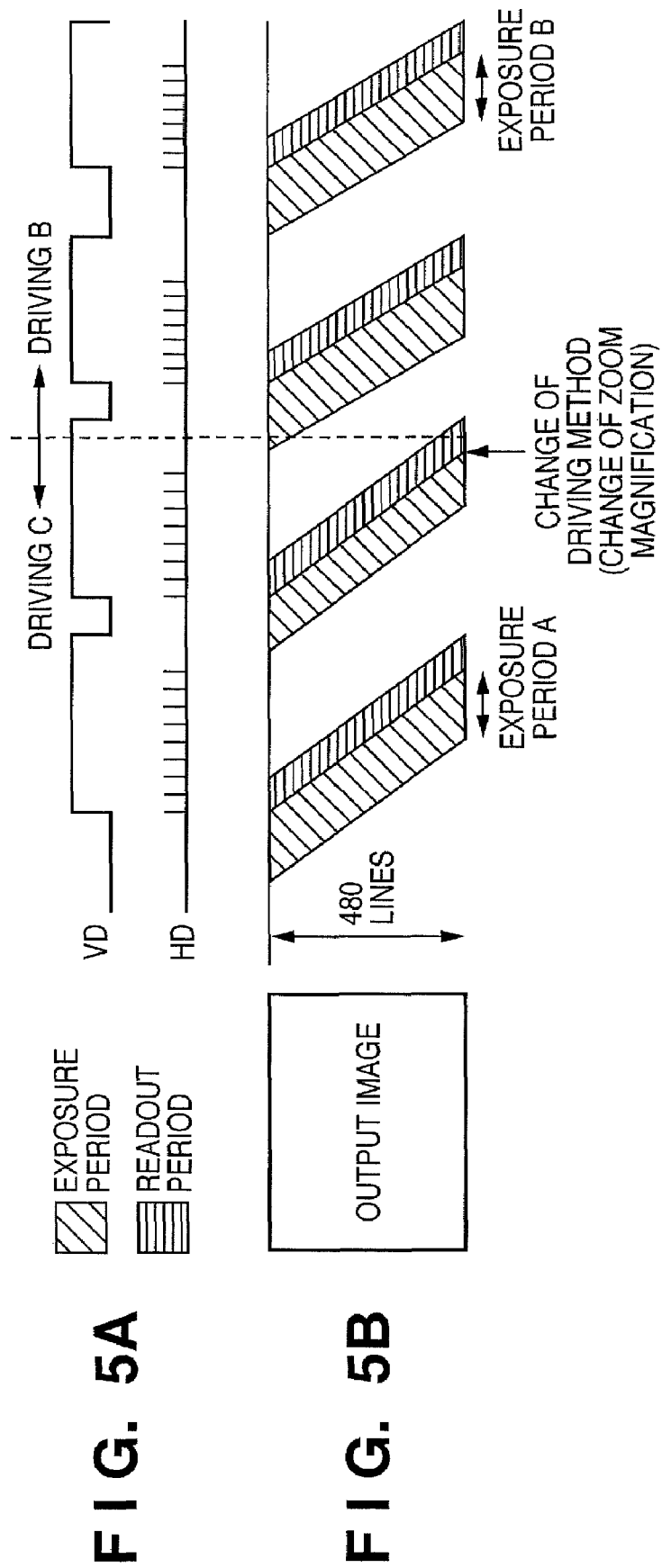

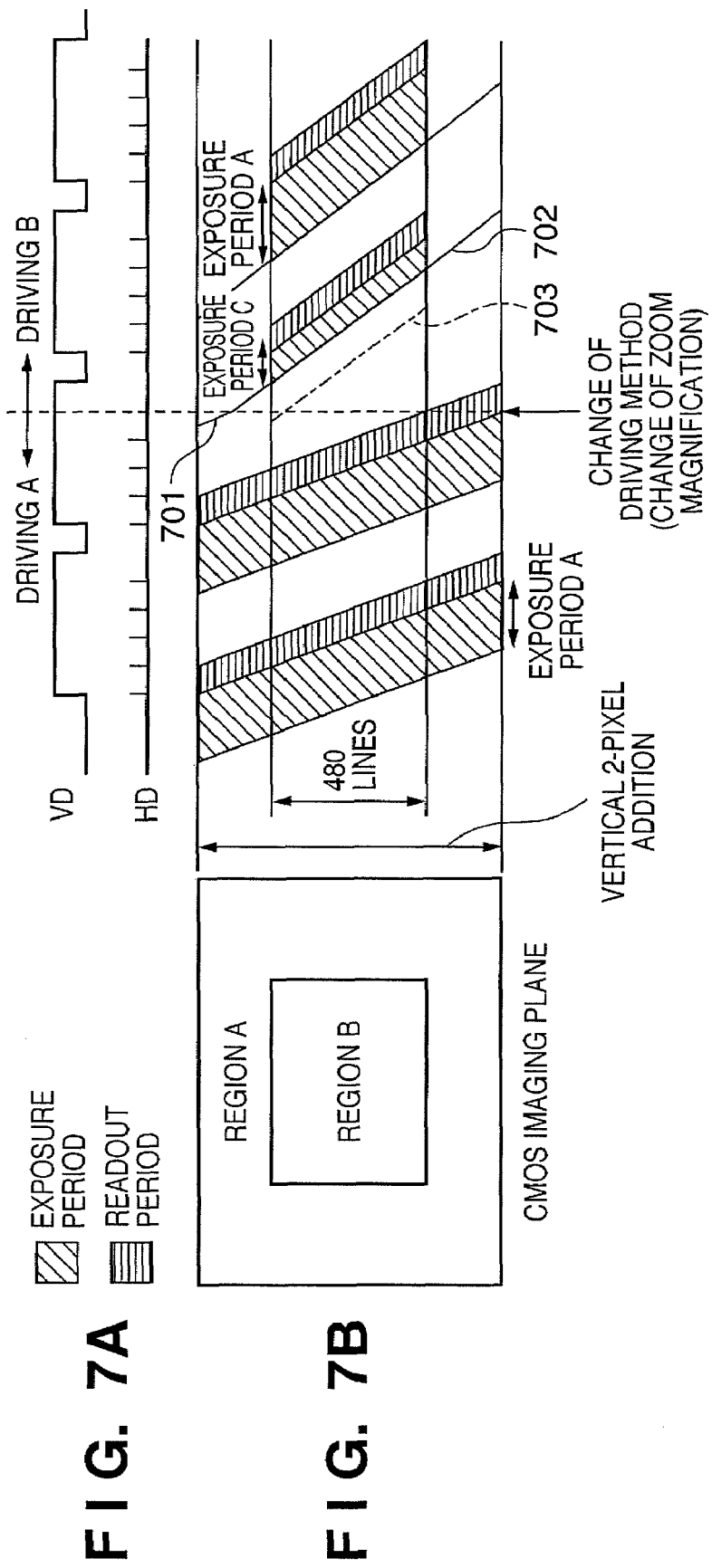

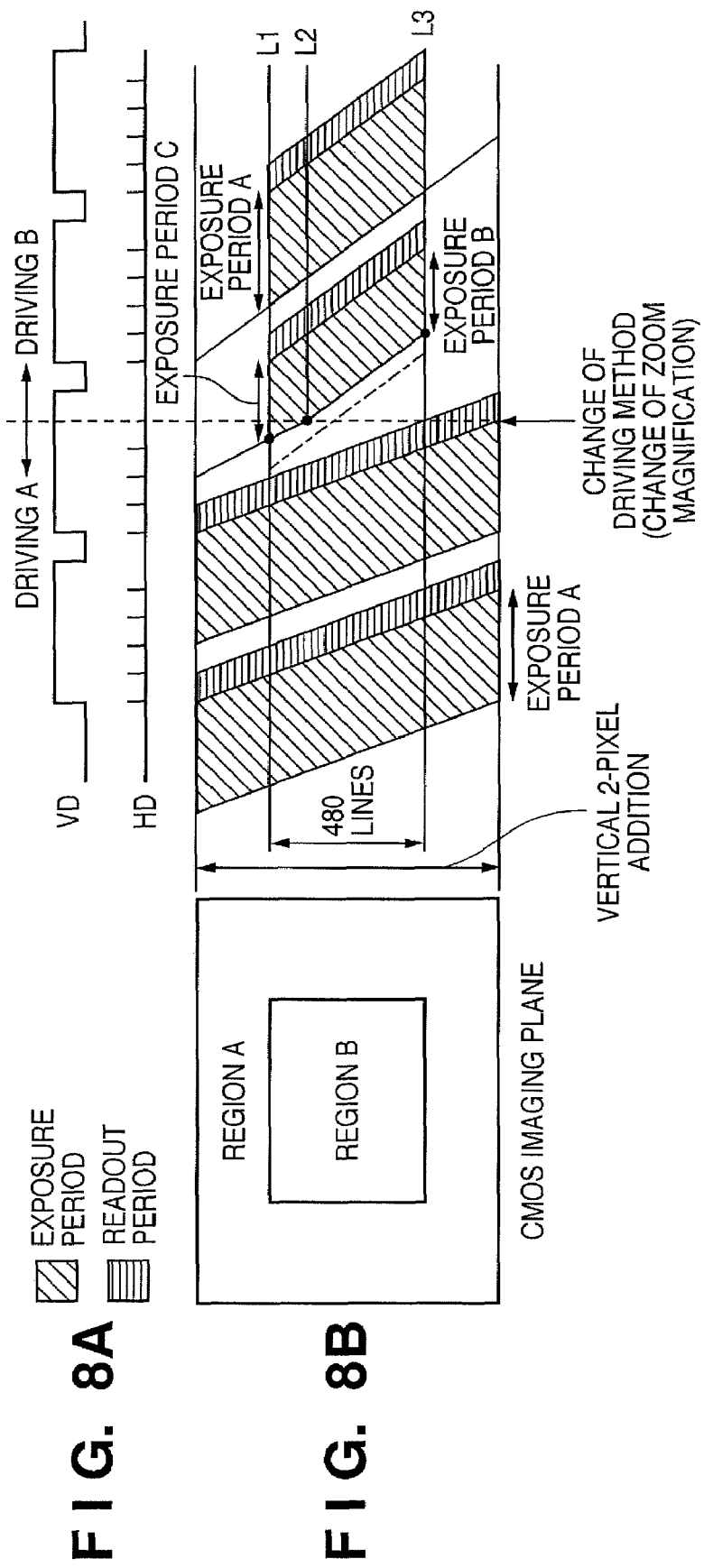

IMAGING APPARATUS, CONTROL METHOD THEREOF, AND IMAGING SYSTEM FOR PERFORMING APPROPRIATE IMAGE CAPTURING WHEN A DRIVING METHOD IS CHANGED

BACKGROUND OF THE INVENTION

1. Field of the Invention

The present invention relates to an imaging apparatus, a control method thereof, and an imaging system.

2. Description of the Related Art

There is a digital camera with a zoom display function as an imaging apparatus having an electronic zoom function (Japanese Patent Laid-Open No. 11-196335). This apparatus uses a frame memory as an image display memory. This apparatus also includes an image display means capable of displaying a moving image, a means for designating a desired image, and an enlarged image display means (electronic zoom function) for enlarging the designated image at a predetermined magnification and displaying the enlarged image on an image display device. This allows zooming in a moving image, still image, or reproduced image on a liquid crystal display device during imaging.

Another imaging apparatus implements an electronic zoom function by changing the sampling frequency of an input image signal (Japanese Patent Laid-Open No. 9-163236). This apparatus includes a charge-coupled image sensor, analog signal processing unit, A/D conversion unit, image memory serving as a frame buffer, digital signal processing unit, D/A conversion unit, monitor, variable sampling clock generation unit, system control unit, and magnification setting unit.

There is still another imaging apparatus that eliminates the exposure period difference between the upper and lower parts of one frame (Japanese Patent Laid-Open No. 2005-94142). This apparatus includes a register that holds part of frame image data output from an image sensor unit, and a control unit that performs a process of writing electronic zoom image data in the register and a process of reading out the held image data of at least one row at a predetermined frame rate. The apparatus also includes a resolution conversion unit that interpolates the readout image data based on the electronic zoom magnification to convert it to the size of image data of one frame.

The imaging apparatuses described in Japanese Patent Laid-Open Nos. 11-196335 and 9-163236 must incorporate a frame memory with a large capacity to keep a predetermined frame rate upon electronic zoom. This results in an increase in power consumption and in the cost and size of the imaging apparatuses. It is particularly difficult to use them for mobile applications. In these imaging apparatuses, the horizontal scan period changes depending on the driving method. Since the exposure period of each frame is an integer multiple of the horizontal scan period, it is difficult to maintain a predetermined exposure period independently of the driving method. When the driving method changes, the exposure period of a frame read out immediately after the change is different from that of a frame before the change. That is, the preceding and succeeding frames have a difference in brightness. Additionally, even in the frame read out immediately after the driving method changes, the exposure period changes between the lines. Hence, the brightness changes in the vertical direction.

The imaging apparatus described in Japanese Patent Laid-Open No. 2005-94142 is a proposal to solve these problems. However, since the readout time of one frame changes between driving modes (readout modes), the degree of distortion of the rolling shutter abruptly changes upon, for example, switching the electronic zoom magnification, resulting in a sense of incongruity of the user.

SUMMARY OF THE INVENTION

The present invention is provided to perform appropriate image capturing when a driving method is changed by a mode change of readout.

A first aspect of the present invention is an imaging apparatus which includes an imaging unit in which a plurality of photoelectric conversion elements are arranged on an imaging plane, and a control unit, wherein the control unit has a first mode in which image signals are read out successively from every predetermined line of a first photoelectric conversion element group arranged in a first region of the imaging plane; and a second mode in which image signals are read out successively from every predetermined line of a second photoelectric conversion element group arranged in a second region which is different from the first region of the imaging plane, and the control unit performs control so as to cause a period from starting readout of the signal of the predetermined line to starting next readout of the signal of the predetermined line in the first mode to be the same as that from starting readout of the signal of the predetermined line to starting next readout of the signal in the second mode.

A second aspect of the present invention is an imaging system which includes an optical system, and an imaging apparatus, the image apparatus including, an imaging unit in which a plurality of photoelectric conversion elements are arranged on a imaging plane; and a control unit, wherein the control unit has a first mode in which image signals are read out successively from every predetermined line of a first photoelectric conversion element group arranged in a first region of the imaging plane; and a second mode in which image signals are read out successively from every predetermined line of a second photoelectric conversion element group arranged in a second region which is different from the first region of the imaging plane, and the control unit performs control so as to cause a period from starting readout of the signal of the predetermined line to starting next readout of the signal of the predetermined line in the first mode to be the same as that from starting readout of the signal of the predetermined line to starting next readout of the signal in the second mode.

A third aspect of the present invention is a method for controlling an imaging apparatus that includes an imaging unit in which a plurality of photoelectric conversion elements are arranged on a imaging plane, and a control unit, the control unit having a first mode in which image signals are read out successively from every predetermined line of a first photoelectric conversion element group arranged in a first region of the imaging plane; and a second mode in which image signals are read out successively from every predetermined line of a second photoelectric conversion element group arranged in a second region which is different from the first region of the imaging plane. Here, the method includes performing control so as to cause a period from starting readout of the signal of the predetermined line to starting next readout of the signal of the predetermined line in the first mode to be the same as that from starting readout of the signal of the predetermined line to starting next readout of the signal in the second mode.

Further features and aspects of the present invention will become apparent from the following description of exemplary embodiments with reference to the attached drawings.

BRIEF DESCRIPTION OF THE DRAWINGS

FIG. 4 is a diagram showing an example readout region of the imaging unit;

FIG. 5A is a diagram showing a readout example as illustrated in FIG. 4;

FIG. 5B is a diagram showing a readout example as illustrated in FIG. 4;

FIG. 7A is a diagram showing a readout example at electronic zoom magnifications of one and two;

FIG. 7B is a diagram showing a readout example at electronic zoom magnifications of one and two;

FIG. 8A is a diagram showing an exposure example and a readout example in a case where a reset of a readout line of the next frame starts when changing a driving method;

FIG. 8B is a diagram showing an exposure example and a readout example in a case where a reset of a readout line of the next frame starts when changing a driving method;

DESCRIPTION OF THE EMBODIMENTS

First Exemplary Embodiment

A first exemplary embodiment of the present invention will be described below. This embodiment relates to an imaging apparatus, a control method thereof, and an imaging system which add or thin pixels and acquire outputs suitable for a plurality of different record image sizes from an imaging unit, thereby recording a moving image.

Figure 1:
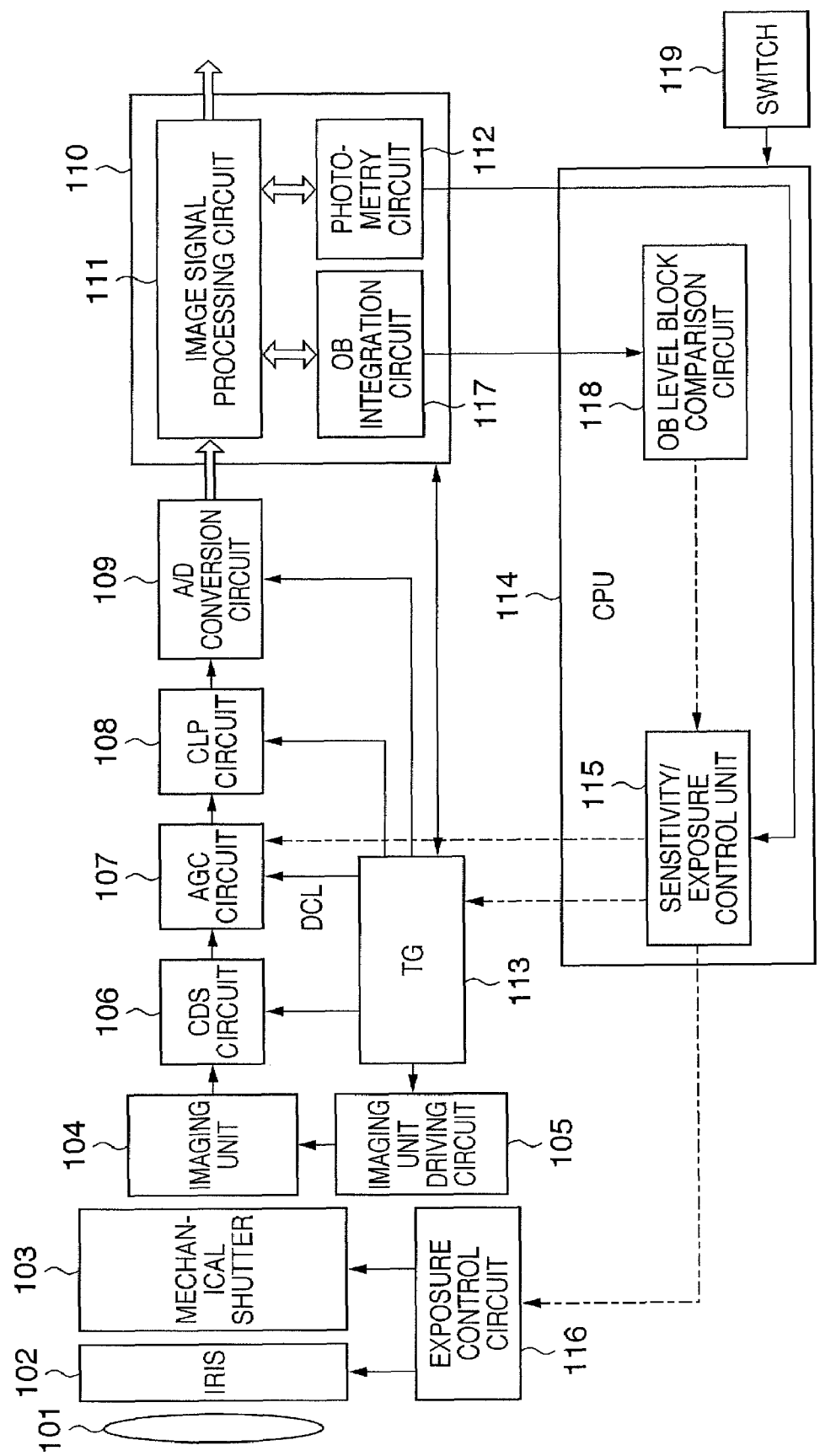
FIG. 1 is a circuit block diagram showing an example schematic configuration of an imaging system.

FIG. 1 is a circuit block diagram for explaining the configuration of an imaging system such as a digital still camera or a digital camcoder.

An optical system 101 such as a lens forms an object image on an imaging plane. An iris 102 controls the amount of imaging plane light from the optical system 101. A mechanical shutter 103 controls the timing of light entering from the optical system 101. An imaging unit 104 converts the object image formed by the optical system 101 into an electrical signal. In this embodiment, the imaging unit 104 includes a CMOS area sensor. An imaging unit driving circuit 105 supplies a pulse with a necessary amplitude to drive the imaging unit 104. A CDS circuit 106 executes correlated double sampling of the output from the imaging unit 104. An AGC circuit 107 amplifies the output signal from the CDS circuit 106. The gain setting of the AGC circuit 107 changes when the user changes the sensitivity setting of the imaging system, or the imaging system automatically increases the gain in cases of low brightness. A clamp circuit (CLP circuit) 108 clamps, of the output signal from the AGC circuit 107, an OB (Optical Black) potential (to be described later) to a reference potential. An A/D conversion circuit 109 converts the analog imaging signal output from the clamp circuit 108 into a digital signal.

An image processing circuit 110 includes an image signal processing circuit 111, photometry circuit 112, and OB integration circuit 117. The image processing circuit 110 includes a WB circuit (not shown) which measures the color temperature of the object based on a signal received from the imaging unit 104 and obtains information necessary for a white balance process in the image signal processing circuit 111. The image signal processing circuit 111 separates the imaging signal converted into a digital signal into luminance and chrominance signals (color difference signals R-Y and B-Y or R, G, and B signals). The photometry circuit 112 measures the amount of photometry from the level of the signal received from the imaging unit 104. A timing pulse generation circuit (TG) 113 generates a timing pulse necessary for the circuits in the units of the imaging system. A CPU 114 controls the units of the imaging system. The CPU 114 has a sensitivity/exposure control unit 115 and an OB level block comparison circuit 118. The OB level block comparison circuit 118 compares the signal level obtained by the OB integration circuit 117 with a preset black level and outputs the result to the sensitivity/exposure control unit 115. The sensitivity/exposure control unit 115 outputs a gain change instruction to the AGC circuit 107 to control the sensitivity and exposure based on information from the photometry circuit 112 and OB level block comparison circuit 118. The sensitivity/exposure control unit 115 also has a function of an exposure control instruction to an exposure control circuit 116. A switch 119 instructs a moving image capturing operation through user operation.

Figure 2:
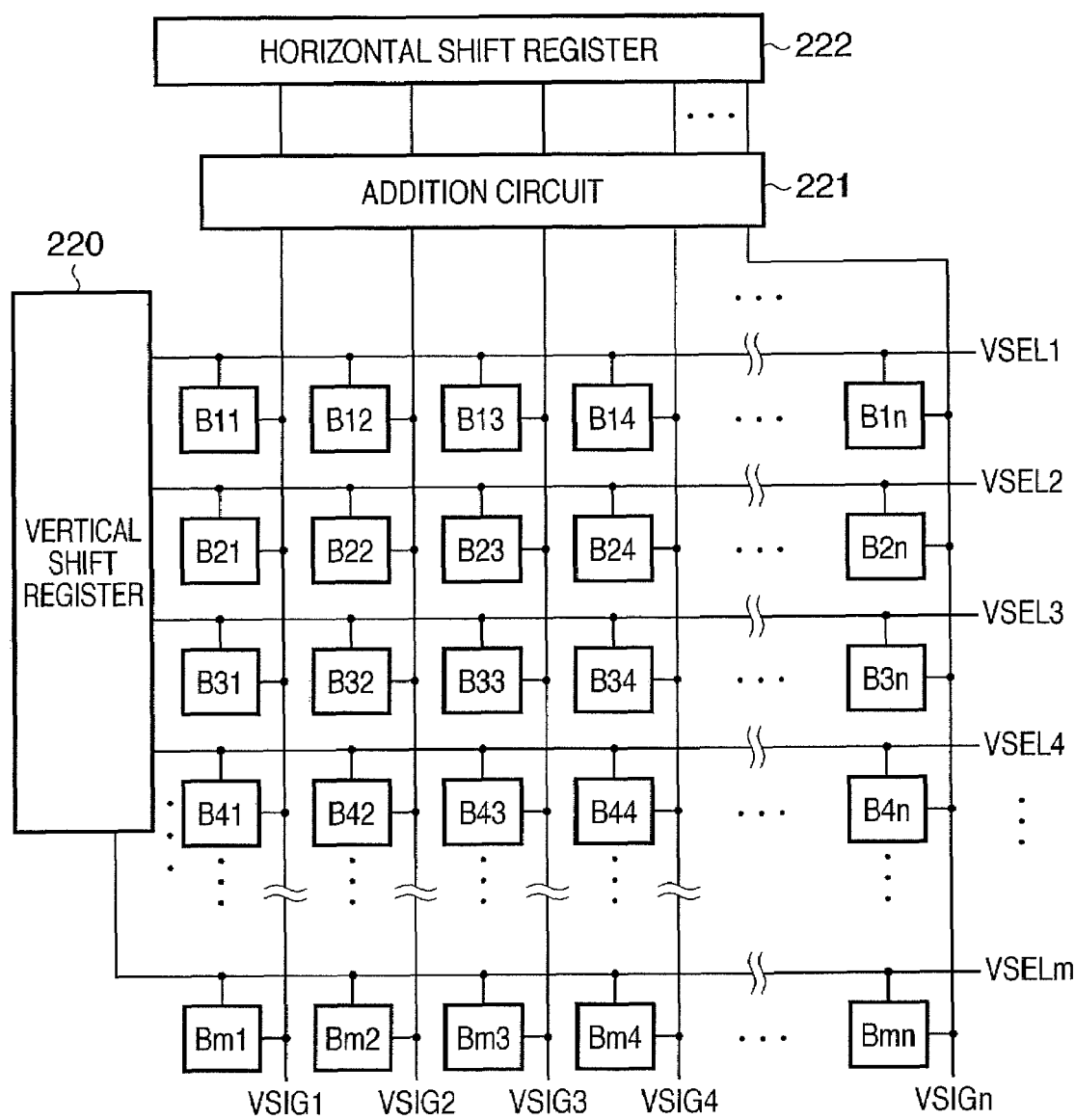
FIG. 2 is an overall diagram showing an example imaging unit using a CMOS image sensor.

FIG. 2 is an overall diagram of the imaging unit (imaging apparatus) using a CMOS image sensor. The imaging unit has pixels B11 to Bmn (m and n are integers: this also applies to the following) two-dimensionally arranged on the imaging plane. This embodiment illustrates 4×4 pixels for descriptive convenience, though the number of pixels is not limited to this. Each of the pixels B11 to Bmn includes a photoelectric conversion element such as a photodiode, an amplification MOS transistor that reads out charges stored in the photoelectric conversion element and amplifies them, and a selection MOS transistor that activates the amplification MOS transistor. A vertical shift register 220 outputs a control pulse to read out electrical signals from the pixels of each of row selection lines VSEL1 to VSE1m. Column signal lines VSIG1 to VSIGn read out the electrical signals from pixels selected by the row selection lines VSEL1 to VSElm. An addition circuit 221 stores the electrical signals. A horizontal shift register 222 successively reads out and scans the electrical signals stored in the addition circuit 221 and outputs the signals in time series. To perform read access to pixels by electronic zoom, the vertical shift register 220 outputs a control pulse to one of the row selection lines VSEL1 to VSElm, which connects to the readout target pixels. In addition, the horizontal shift register 222 outputs a control pulse to one of the column signal lines VSIG1 to VSIGn, which connects to the readout target pixels. The electrical signals from the pixels selected by the control pulse of the row selection lines VSEL1 to VSElm are read out to the addition circuit 221 in accordance with the control pulse of the column signal lines VSIG1 to VSIGn. The addition circuit 221 passes the electrical signals without storing them. In readout at an electronic zoom magnification of 2, signals from two pixels are added and averaged in the horizontal direction, and signals from two pixels are added and averaged in the vertical direction.

Figure 3:
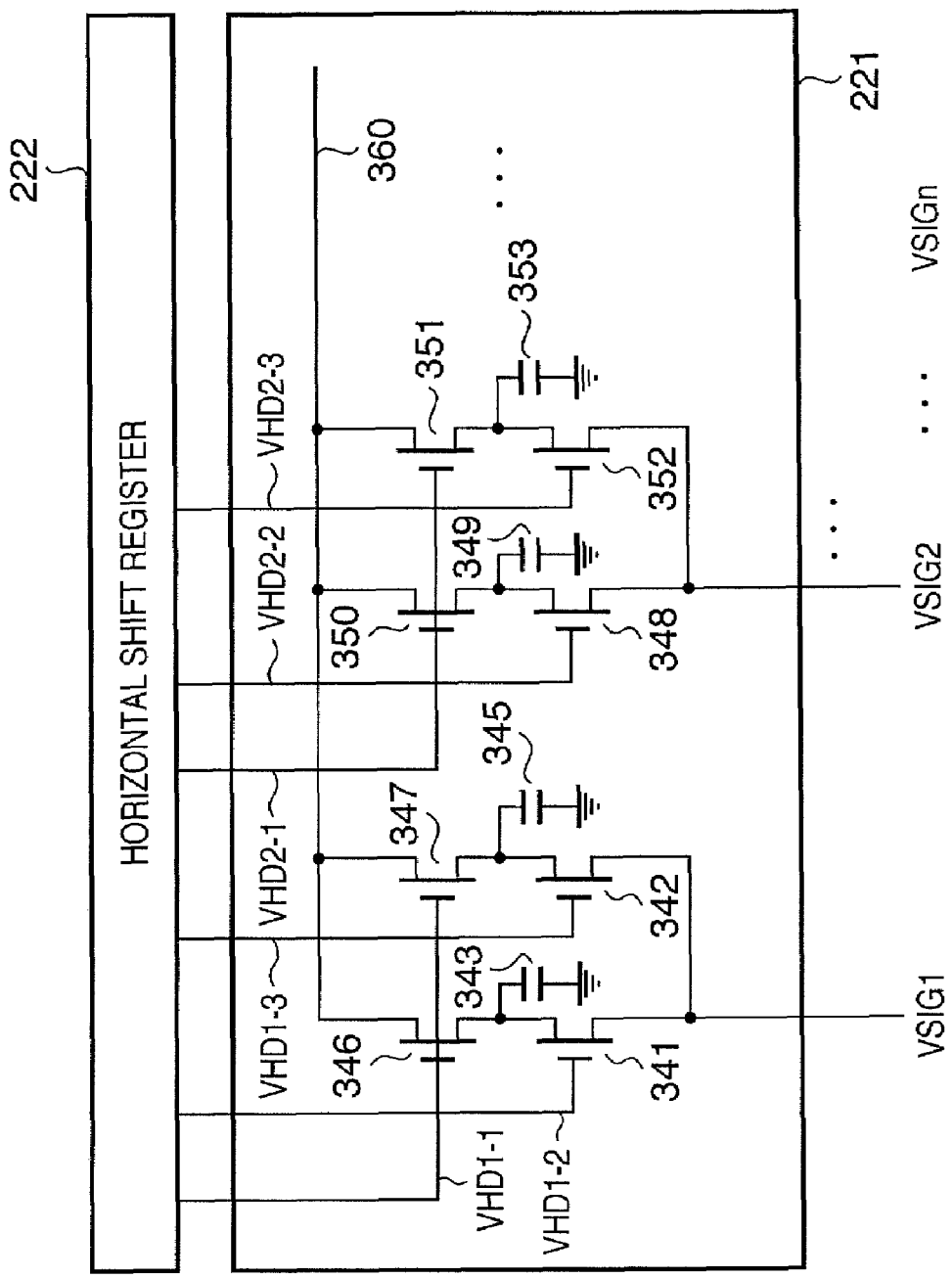
FIG. 3 is a diagram showing an addition example of two horizontal pixels and that of two vertical pixels.

A readout method at an electronic zoom magnification of 1 will be explained. First, the vertical shift register 220 outputs a control pulse to each of the row selection lines VSEL1 to VSElm. The column signal lines VSIG1 to VSIGn read out the electrical signals from the pixels selected by the control pulse of the row selection lines VSEL1 to VSElm. The addition circuit 221 stores the electrical signals read out to the column signal lines VSIG1 to VSIGn. FIG. 3 shows an example wherein the addition circuit 221 adds 2×2 pixels B11, B12, B21, and B22 in the horizontal and vertical directions.

Referring to FIG. 3 now, storage capacitors 343 and 349 store the output signals from the pixels B11 and B12 selected by the row selection line VSEL1 from the column signal lines VSIG1 and VSIG2 connected to the pixels B11 and B12, respectively, via transfer switches 341 and 348. Horizontal transfer pulses from horizontal transfer lines VHD1-2 and VHD2-2 ON/OFF-control the transfer switches 341 and 348.

Storage capacitors 345 and 353 store the output signals from the pixels B21 and B22 selected by the row selection line VSEL2 at the next timing from the column signal lines VSIG1 and VSIG2 connected to the pixels B21 and B22, respectively, via transfer switches 342 and 352. Horizontal transfer pulses from horizontal transfer lines VHD1-3 and VHD2-3 ON/OFF-control the transfer switches 342 and 352.

After that, the horizontal shift register 222 supplies horizontal transfer pulses to horizontal transfer lines VHD1-1 and VHD2-1 to turn on transfer switches 346, 347, 350, and 351. A horizontal output line 360 adds the output signals output from the pixels B11 and B12 and stored in the storage capacitors 343 and 349 and the output signals output from the pixels B21 and B22 and stored in the storage capacitors 345 and 353, thus ending addition of the 2 horizontal pixels×2 vertical pixels.

In such pixel addition, the readout time of one line changes depending on the addition method or readout region. The time necessary for reading out one line (1-line readout time) is given by $$\text{1-line readout time} = HBLK \text{ (horizontal blanking period)} \times \alpha + Skip \text{ (thinning period)} \times \beta + \text{number of horizontal pixels} \times \text{reference clock time} \quad (1)$$

where $\alpha$ and $\beta$ are determined by the pixel addition method or pixel thinning method. The 1-line readout time changes depending on the pixel addition method, pixel thinning method, or driving frequency. The exposure period is an integer multiple of the horizontal readout pulse because the reset pulse is driven by the same driving frequency as in driving the horizontal readout pulse. For this reason, the exposure period changes depending on the driving method. In addition, the exposure start time may change between the upper and lower parts of a frame upon reading out the same number of lines depending on the driving method because the 1-line readout period changes.

The time difference between a driving method (driving C) using an electronic zoom magnification of 1 and a driving method (driving A) for reading out the central region of the imaging unit 104 at an electronic zoom magnification of 2 in the 4-pixel addition will be described next.

FIG. 4 is a diagram showing an example of the readout region of the imaging unit. Consider only an effective pixel region 401 of the imaging unit 104, for descriptive convenience. When the electronic zoom magnification is 1, the effective pixel region 401 (region A) (1280 horizontal pixels× 960 vertical pixels) is wholly read out. When the electronic zoom magnification is 1, 4-pixel addition, that is, addition of 2 vertical pixels×2 horizontal pixels is done. Hence, the output from the imaging unit 104 corresponds to 640 horizontal pixels×480 vertical pixels. When the electronic zoom magnification is 2, a region (region B) 402 including the center of the imaging unit 104 and 640 horizontal pixels×480 vertical pixels with the same center is read out. Even in this driving method, the output from the imaging unit 104 corresponds to 640 horizontal pixels×480 vertical pixels. That is, even upon electronic zoom, the number of output pixels of the imaging unit 104 is equal to or more than the number of record pixels of the imaging unit 104 without electronic zoom. It is therefore possible to capture a high-quality moving image without interpolation.

When the electronic zoom magnification rises to make the number of horizontal and vertical pixels of the readout region smaller than that of the output image, a degraded output image can be obtained by executing interpolation. If the magnification does not change, it is possible to obtain a higher-quality moving image by reading out pixels more densely.

According to Equation 1, when the values $\alpha$ and $\beta$ corresponding to each electronic zoom magnification are determined, the 1-line readout time in each driving method is obtained. When the electronic zoom magnification is 1, $\alpha=3$, $\beta=2$, and the number of horizontal pixels=640. When the electronic zoom magnification is 2, $\alpha=1$, $\beta=1$, and the number of horizontal pixels=640. That is, an extra time corresponding to HBLK×2+Skip×1 is necessary in executing pixel addition.

FIGS. 5A and 5B show an example of readout. FIG. 5A is a timing chart with an abscissa representing the time and an ordinate representing changes in pulses. In FIG. 5B, the abscissa represents the time synchronous with the timing in FIG. 5A, and the ordinate represents the exposure period and readout period of each line. FIGS. 5A and 5B show horizontal transfer pulses HD of horizontal transfer lines which are thinned more than actual for descriptive convenience. The exposure period is controlled in synchronism with the horizontal driving signal HD that determines the period from starting readout of the signal of one line of the imaging unit to starting the next readout of the signal of one line. As a result, the exposure period is an integer multiple of the pulse interval of the horizontal driving signals HD. The following is apparent from the above explanation.

(1) Since the horizontal driving signal HD changes depending on the driving method, the driving circuit of the imaging unit 104 becomes complex and large.

(2) When the driving method changes, the exposure period also changes before and after the change of the driving method, except when the exposure period becomes an integer multiple of the least common multiple of the horizontal driving signals HD before and after the change of the driving method.

To solve the problems (1) and (2), when the electronic zoom magnification is, for example, 2, an extra time corresponding to HBLK×2+Skip×1 is added to the horizontal blanking period. This eliminates the exposure period difference between the driving methods.

Figures 6A, 6B:
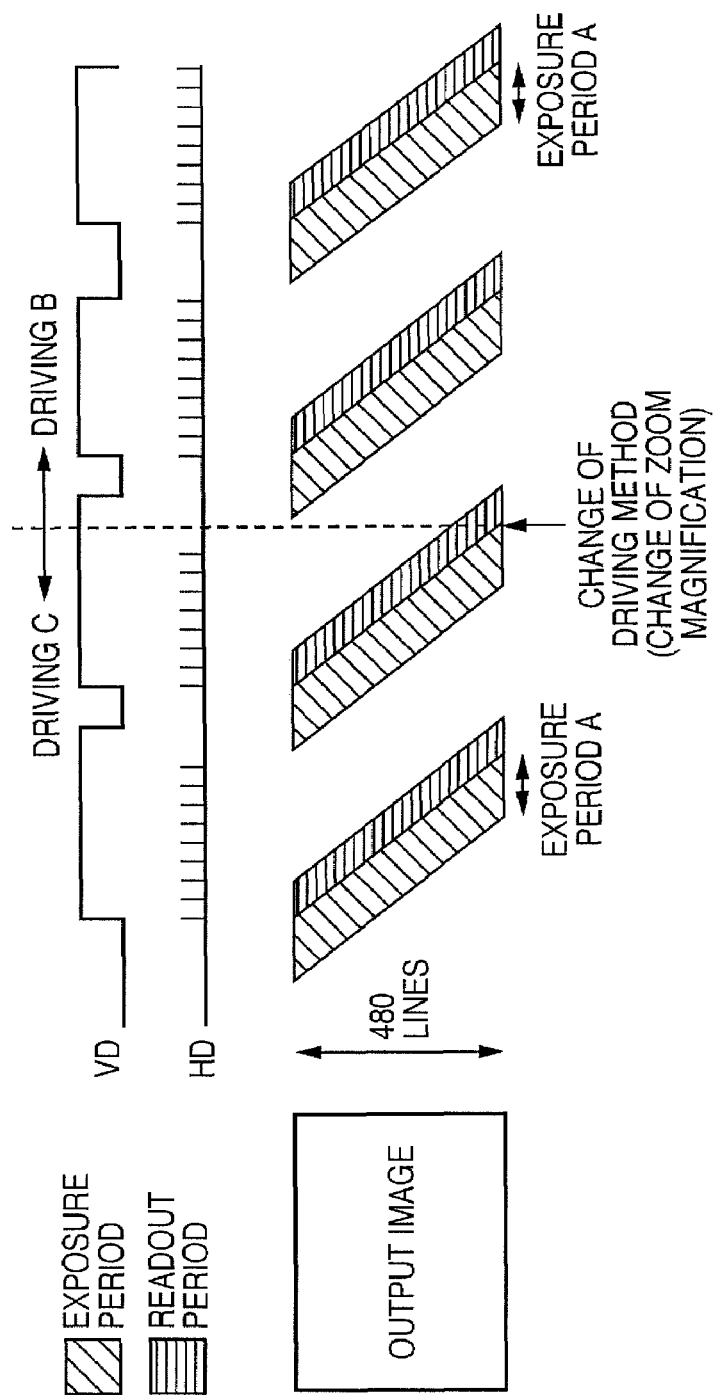
FIG. 6A is a diagram showing a readout example according to a first embodiment of the present invention.
FIG. 6B is a diagram showing a readout example according to the first embodiment of the present invention.

FIGS. 6A and 6B show an example readout. FIG. 6A is a timing chart with an abscissa representing the time and an ordinate representing changes in pulses. In FIG. 6B, the abscissa represents the time synchronous with the timing in FIG. 6A, and the ordinate represents the exposure period and readout period of each line. FIGS. 6A and 6B also show the horizontal transfer pulses HD which are thinned more than actual for descriptive convenience, like FIGS. 5A and 5B. Even when the electronic zoom magnification changes from 2 to 1, the readout time of each line does not change. That is, since the horizontal transfer pulse HD remains constant, the exposure period after the driving method changes is the same as that before the change. Additionally, the degree of distortion of the rolling shutter in one frame does not change between different driving methods.

This embodiment has exemplified electronic zoom magnifications of 1 and 2. Even at another electronic zoom magnification, it is possible to obtain the same effect by adjusting the horizontal blanking period.

In the actual imaging unit 104, the number of vertical pixels may have a fraction when the electronic zoom magnification changes, that is, when the driving method changes. The number of pixels does not always match at each zoom position. Even in this case, the exposure period can be almost equal by keeping the horizontal driving signal HD constant.

A steady state in different driving methods has been described above. The problem of a frame that is read out immediately after the driving method changes, that is, the electronic zoom magnification change will be described next.

For the descriptive convenience, a system having two driving methods with electronic zoom magnifications of 1 and 2 will be described with reference to FIGS. 7A and 7B. FIG. 7A is a timing chart with an abscissa representing the time and an ordinate representing changes in pulses. In FIG. 7B, the abscissa represents the time synchronous with the timing in FIG. 7A, and the ordinate represents the exposure period and readout period of each line. When the electronic zoom magnification is 1 (driving A), the entire imaging plane (region A) corresponding to 480 lines in vertical 2-pixel addition, that is, 960 lines, is read out. When the electronic zoom magnification is 2 (driving B), 480 lines (region B) at the center are read out without pixel addition.

At this time, the electronic zoom magnification, that is, the driving method changes during the vertical blanking period (VBLK) from the end of readout of all lines of a frame to the start of readout of the next frame.

When the driving method changes after the start of reset of the next frame under this condition, the reset start timing in the frame immediately after the change of the driving method complies with the reset start timing before the change of the driving method. Hence, since the exposure period is different from that intended for the driving method after the change, only the frame read out immediately after the driving method changes has a brightness different from other frames.

This will be described in detail by using the example in FIGS. 7A and 7B. Reset of the next frame starts before the driving method changes. The driving method before the change executes vertical 2-pixel addition. Two lines on the imaging unit 104 are successively reset in the time to read out one line of the output image (701). Reaching the driving method change point, each line on the imaging unit 104 is successively reset in the time to read out one line of the output image (702).

To maintain the predetermined frame rate independently of the driving method, readout of the first readout target line on the imaging unit 104 in each driving method must start at a predetermined interval. Accordingly, it is necessary to reset the first readout line on the imaging unit 104 in each driving method at a predetermined interval.

However, after the driving method changes, readout starts from the 240th line. It is therefore necessary to reset the 240th line at an earlier timing by a time corresponding to the exposure period (703).

However, before the driving method changes, reset starts from the first line at an earlier timing than the start of readout of the 240th line by a time corresponding to the exposure period (701). For this reason, reset of the 240th line delays by a time required to reach the 240th line from the start of reset in the driving method before the change (702).

As a solution to this problem, the succeeding frame is corrected by compensating the exposure period difference so as to equalize the brightness between the preceding frame and the succeeding frame. For example, the following method is usable. Normally, the CDS circuit 106 shown in FIG. 1 increases the gain of the output signal from the imaging unit 104. The exposure period difference can be compensated by changing the frame gain so that the preceding and succeeding frames have the same brightness.

An exposure period A is a normal exposure period. An exposure period C is the exposure period of a frame immediately after the driving method changes. Let $\alpha$ be the initial gain to be multiplied by the output from the imaging unit 104. The changed gain is obtained by multiplying the ratio A/C between the normal exposure period A and the exposure period C immediately after the change of the driving method by $\alpha$. That is, the changed gain is $\alpha \times A/C$.

Furthermore, it is possible to make the preceding and succeeding frames have almost the same brightness by multiplying each line by an appropriate gain.

A case wherein the driving method changes after the start of reset of the readout line by the driving method after the change will be described next.

FIGS. 8A and 8B are views showing exposure and readout in the case wherein reset of a readout line of the next frame starts when changing the driving method. FIG. 8A is a timing chart with an abscissa representing the time and an ordinate representing changes in pulses. In FIG. 8B, the abscissa represents the time synchronous with the timing in FIG. 8A, and the ordinate represents the exposure period and readout period of each line. As shown in FIGS. 8A and 8B, when the driving method changes while the readout line after the change of the electronic zoom magnification is successively being reset, the exposure period of each line of the output image changes even in a single frame. More specifically, the exposure period shifts between all lines (i.e., L1 to L2) reset before the change of the driving method. For the lines (e.g., L2 to L3) reset after the change of the driving method, the exposure period between the lines does not change, although the exposure period is different from the preceding and succeeding frames. For this reason, the frame immediately after the change of the driving method has a brightness different from the preceding and succeeding frames. In addition, the brightness changes even between the lines in the single frame.

Figure 9:
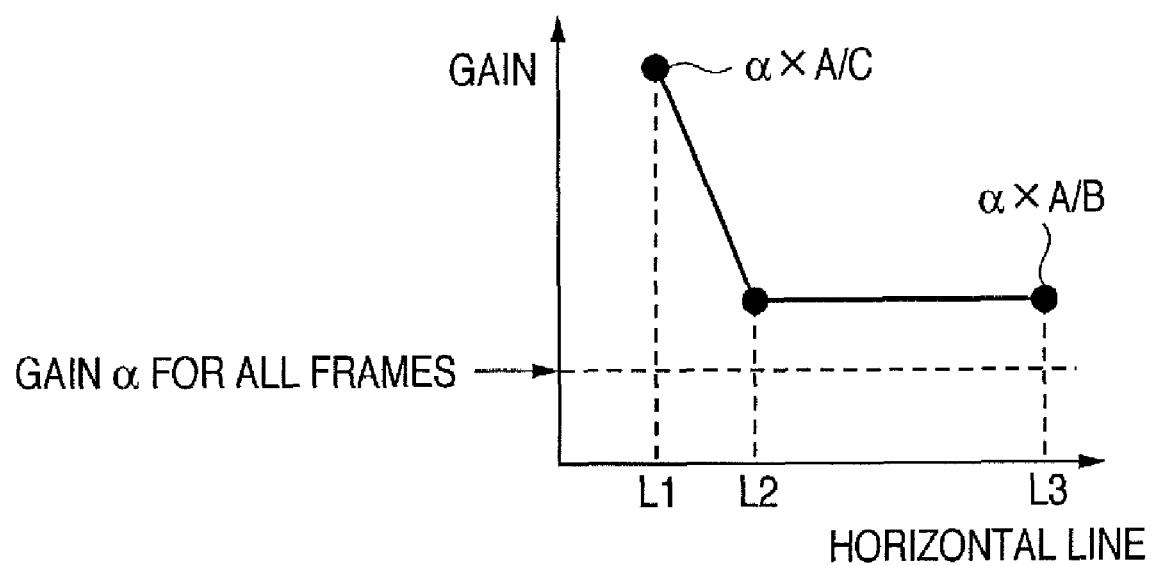
FIG. 9 is a diagram showing a gain example in a case where the reset of the readout line of the next frame starts when changing the driving method according to the first embodiment of the present invention.

A solution to this problem will be described. As described above, the CDS circuit 106 shown in FIG. 1 increases the gain of the output signal from the imaging unit 104. The exposure period difference can be compensated by changing the gain of each line in a frame as shown in FIG. 9 so that the preceding and succeeding frames have the same brightness.

An exposure period A is a normal exposure period. An exposure period B is the exposure period of a line reset after the change of the driving method in a frame immediately after the driving method changes. An exposure period C is the exposure period of a first line output in a frame immediately after the driving method changes.

The gain changes between the lines. Let $\alpha$ be the gain to be used in all frames. As shown in FIG. 9, the gain of the first output line (L1) is defined as $\alpha \times A/C$, and the gain of the line (L2) reset when changing the driving method is defined as $\alpha \times A/B$. The gain of a line reset immediately before the change of the driving method is obtained by linearly connecting the two points. The gain of the lines (i.e., from L2 to L3) reset after the change of the driving method is uniformly defined as α×A/B.

When reset of the next frame starts before the change of the driving method, the exposure period of the frame immediately after the change of the driving method is different from those of other frames. However, when reset of the next frame starts after the change of the driving method, the exposure period of the frame immediately after the change of the driving method equals those of the other frames. Since an intended exposure period is obtained, it is unnecessary to further multiply a gain.

Figure 10:
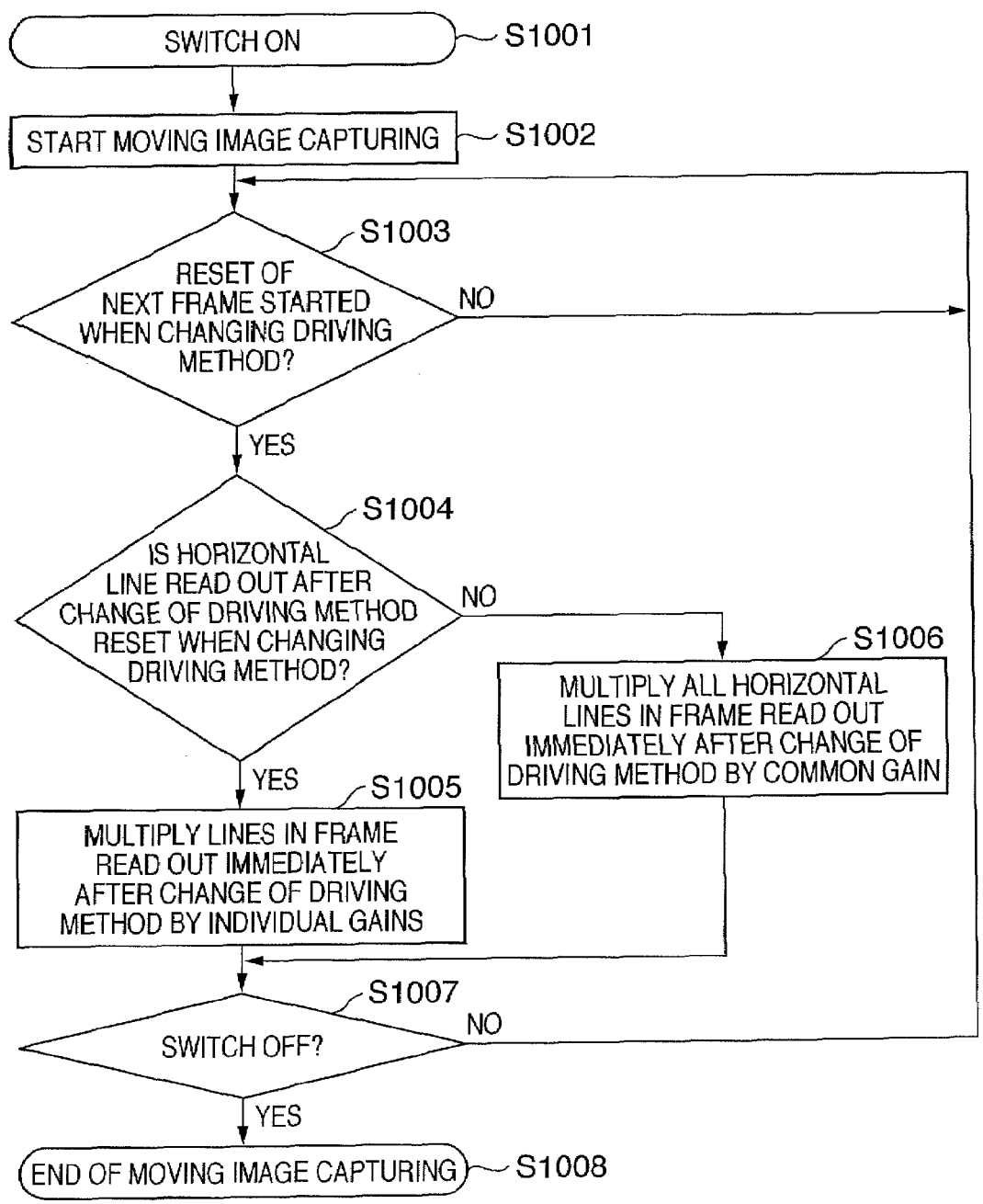
FIG. 10 is a flowchart showing a gain change example for every line according to the first embodiment of the present invention.

The operation of the first embodiment will be explained with reference to the flowchart in FIG. 10. In step S1001, the user turns on the switch 119 to give the instruction for the start of the moving image capturing operation. In step S1002, the moving image capturing process starts.

In step S1003, as the driving method in moving image capturing changes, the reset timing changes in accordance with the exposure period. In this case, it is determined whether reset of the next frame has started before readout of a given frame finishes when changing the driving method. If reset of the next frame has started (YES in step S1003), the process advances to step S1004.

In step S1004, it is determined whether a horizontal line of the next frame read out after the change of the driving method has been reset before readout of a given frame finishes when changing the driving method. If the reset operation of the line to be read out by the next driving has started before readout of the frame finishes (YES in step S1004), the process advances to step S1005. Otherwise (NO in step S1004), the process advances to step S1006.

In step S1005, the lines in the frame read out immediately after the change of the driving method are multiplied by individual gains, as shown in FIG. 9. In step S1006, all lines in the frame read out immediately after the change of the driving method are multiplied by a common gain. This makes the preceding and succeeding frames have almost the same brightness by changing the gain between the lines and also makes the lines in the frame have almost the same brightness.

In step S1007, it is determined whether the user has turned off the switch 119 to give the instruction for the end of the moving image capturing operation. If the user has turned off the switch 119 (YES in step s1007), moving image capturing finishes (step S1008). If the user has not turned off the switch 119 (NO in step s1007), the process returns to step S1003.

For the sake of simplicity, an example wherein two modes are present, and the electronic zoom magnification rises has been described. However, the same effect can be obtained even when the imaging system has a plurality of driving methods, or the electronic zoom magnification drops.

In the above example, the CDS circuit increases the gain. However, the same effect can be obtained by another analog circuit such as an AGC circuit and a digital circuit after A/D conversion.

As described above, even when exposure of the next frame starts before the change of the electronic zoom magnification (the change of the driving method), the difference in the set exposure period between the lines of a frame read out immediately after the change of the driving method is compensated by multiplying a gain. This allows suppressing the difference in the amount of exposure between the preceding and succeeding frames and the difference in the amount of exposure between the lines in a frame.

A storage medium (not shown) in the imaging system stores the contents of the operation as program codes. The CPU 114 in the imaging system can read out and execute the program codes.

Second Exemplary Embodiment

Figure 11:
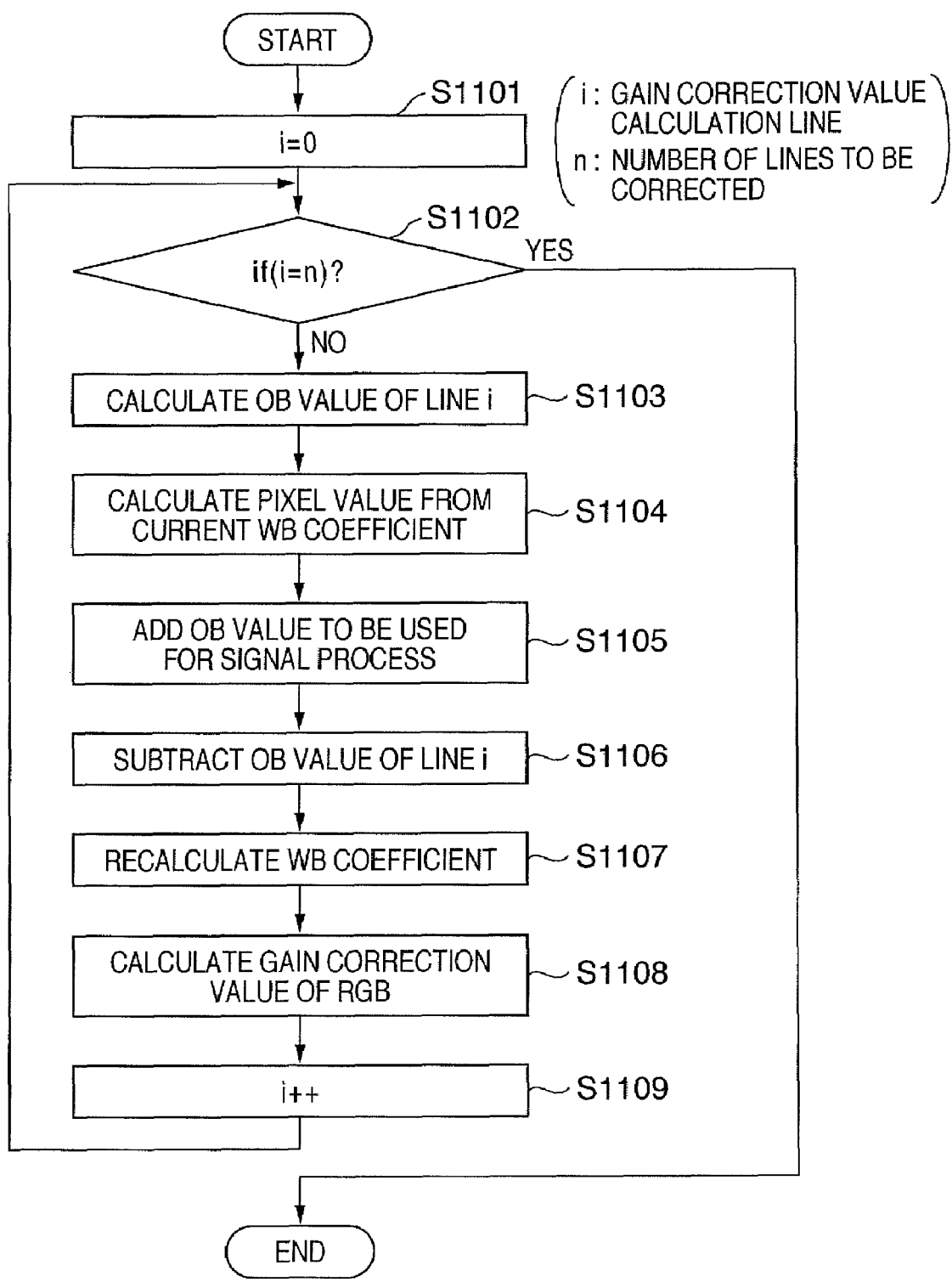
FIG. 11 is a flowchart showing a setting example of a gain correction value for every color according to a second embodiment of the present invention.

The first embodiment multiplies all pixels by the same gain. As a characteristic feature of the second embodiment, a gain correction value is settable for every color. This method takes, for example, a change in black level caused by the storage period difference between the lines into consideration. Since the color balance changes between lines, color balance correction is done simultaneously with brightness correction. A method for calculating a gain correction value for every color will be described with reference to FIG. 11.

In step S1101, an initial value for the process is acquired. More specifically, the value of a gain correction value calculation line i is set to 0, and the number n of lines to be corrected is set to a desired value (not shown).

In step S1102, it is determined whether the value of the gain correction value calculation line i matches the number n of lines to be corrected. If the values match (YES in step S1102), the process advances to step S1110 to end the process. If the values do not match (NO in step S1102), the process advances to step S1103.

In step S1103, the OB (Optical Black) value in the gain correction value calculation line i is calculated. In step S1104, the pixel value is calculated by calculating the reciprocal of the current white balance coefficient (WB coefficient). In step S1105, the OB value to be used for the signal process is added to calculate the pixel value before OB subtraction. In step S1106, the OB value in the line i, which is calculated in step S1103, is subtracted.

In step S1107, the WB coefficient is recalculated from the newly obtained pixel value. In step S1108, the ratio of the WB coefficient calculated in step S1107 to the WB coefficient used for the signal process is calculated. The gain correction value calculated from the storage period is multiplied by the ratio, thereby calculating the gain correction value for every color. In step S1109, the value of the gain correction value calculation line i is incremented by one (i=i+1), and the process returns to step S1102.

This process is executed in all lines as the gain correction target. The gain correction value of each line is calculated by the above-described process. It is therefore possible to minimize degradation of the S/N ratio by inhibiting gain correction when the storage period is shorter than the predetermined value in FIG. 11.

Third Exemplary Embodiment

In the second embodiment, the lightness difference between the upper and lower parts of a frame is completely corrected. However, since this correction method uses a gain, the S/N ratio of lines that have undergone gain correction degrades. In the third embodiment, complete correction is done only in, for example, an EVF display mode without saving image data in a recording medium, in addition to the second embodiment. Upon capturing, for example, a moving image, correction is done in consideration of trade-off of the lightness and S/N ratio between the upper and lower parts of a frame by setting a limiting value (upper limit) of a correction gain. Gain correction of the third embodiment also uses a gain correction value for every color, as in the second embodiment. For this reason, the limiting value is also set for every color.

Figure 12:
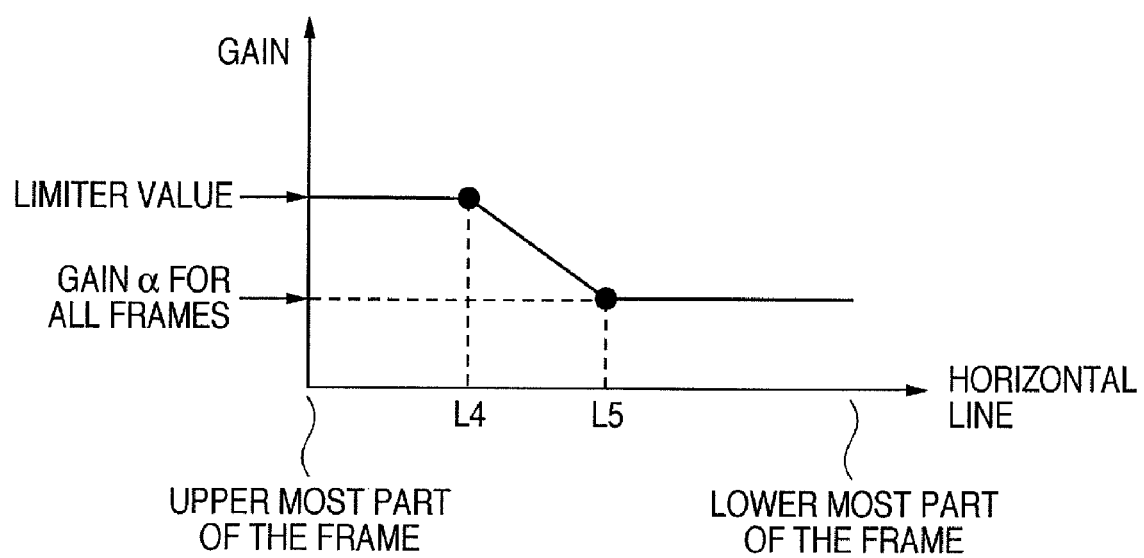
FIG. 12 is a diagram showing a setting example of a limiting value according to a third embodiment of the present invention.

FIG. 12 shows a gain correction amount considering the limiting value for a certain color to be used in moving image capturing. Referring to FIG. 12, the abscissa represents the horizontal line, and the ordinate represents the gain. The amount of gain correction from the uppermost part of the frame to L4 is set as the limiting value, thereby minimizing degradation of the S/N ratio in this region. The region from L4 to L5 undergoes complete correction by gain correction. The region from L5 to the lowermost part of the frame has no storage period difference so that the gain is constant. In this way, in moving image capturing, correction is done in consideration of trade-off of the lightness and S/N ratio between the upper and lower parts of a frame. To completely remove degradation of the S/N ratio, a frame whose upper and lower parts have a storage period difference upon switching imaging driving may be replaced with a frame before switching of imaging driving.

Other Exemplary Embodiments

The present invention may also achieved by supplying a storage medium which records software program codes to implement the functions of the embodiment to a system or apparatus, and causing the computer (or CPU or MPU) of the system or apparatus to read out and execute the program codes stored in the storage medium. In this case, the program codes read out from the storage medium themselves implement the functions of the above-described embodiment. The storage medium that stores the program codes constitutes the present invention. Examples of the storage medium to supply the program codes are a flexible disk, hard disk, optical disk, magneto-optical disk, CD-ROM, CD-R, magnetic tape, nonvolatile memory card, and ROM.

The functions of the above-described embodiment are implemented by causing the computer to execute the readout program codes. The present invention also incorporates a case wherein the OS (Operating System) running on the computer partially or wholly executes actual processing based on the instructions of the program codes, thereby implementing the functions of the above-described embodiment.

The program codes read out from the storage medium are written in the memory of a function expansion board inserted into the computer or a function expansion unit connected to the computer. The CPU 114 of the function expansion board or function expansion unit partially or wholly executes actual processing based on the instructions of the program codes, thereby implementing the functions of the above-described embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-183847, filed Jul. 3, 2006, which is hereby incorporated by reference herein in its entirety.

What is claimed is:

1. An imaging apparatus comprising:
an imaging unit in which a plurality of photoelectric conversion elements are arranged on a imaging plane; and
a control unit which controls the imaging unit, wherein
the control unit reads out imaging signals for one frame in either first mode in which image signals are read out successively from every predetermined line of a first photoelectric conversion element group arranged in a first region of the imaging plane; or a second mode in which image signals are read out successively from every predetermined line of a second photoelectric conversion element group arranged in a second region which is different from the first region of the imaging plane;
the control unit changes a gain for a frame which is read out after a mode change, based on the ratio between exposure periods of frames before and after the mode change, so as to compensate a difference between exposure periods of frames before and after the mode change;
if a reset of a readout line of a frame to be read out has been started at the time when the mode is changed, the control unit changes the gain according to an exposure period of the readout line; and
the control unit performs control so as to cause a period from starting readout of the signal of the predetermined line to starting next readout of the signal of the predetermined line in the first mode to be the same as that from starting readout of the signal of the predetermined line to starting next readout of the signal in the second mode.

2. An imaging apparatus according to claim 1, the control unit changes the gain for every color.

3. An imaging apparatus according to claim 1, the control unit sets an upper limit of the gain.

4. An imaging apparatus according to claim 3, the control unit sets the upper limit when capturing moving images, and the control unit does not set the upper limit when displaying an electronic viewfinder.

5. An imaging apparatus according to claim 4, the control unit only changes the gain when displaying the electronic viewfinder.

6. An imaging apparatus comprising:
an imaging unit in which a plurality of photoelectric conversion elements are arranged on a imaging plane; and
a control unit which controls the imaging unit, wherein
the control unit reads out image signals for one frame in either a first mode in which image signals are read out successively from every predetermined line of a first photoelectric conversion element group arranged in a first region of the imaging plane; or a second mode in which image signals are read out successively from every predetermined line of a second photoelectric conversion element group arranged in a second region which is different from the first region of the imaging plane;
the control unit performs control so as to cause a period from starting readout of the signal of the predetermined line to starting next readout of the signal of the predetermined line in the first mode to be the same as that from starting readout of the signal of the predetermined line to starting next readout of the signal in the second mode, by performing correction for a frame which is read out after a mode change so as to compensate a difference between exposure periods of frames before and after the mode change; and
the control unit does not perform the correction when storage time of the photoelectric conversion elements is below or equal to a predetermined time.

7. An imaging apparatus according to claim 6, the control unit replaces a frame to be read out after the mode change by a frame after the mode change when capturing moving images.

8. An imaging system comprising:
an optical system; and
an imaging apparatus, the image apparatus including, an imaging unit in which a plurality of photoelectric conversion elements are arranged on a imaging plane; and a control unit, wherein the control unit reads out image signals for one frame in either a first mode in which image signals are read out successively from every predetermined line of a first photoelectric conversion element group arranged in a first region of the imaging plane; and a second mode in which image signals are read out successively from every predetermined line of a second photoelectric conversion element group arranged in a second region which is different from the first region of the imaging plane;

the control unit changes a gain for a frame which is read out after a mode change, based on the ratio between exposure periods of frames before and after the mode change, so as to compensate a difference between exposure periods of frames before and after the mode changes;

if a reset of a readout line of a frame to be read out has been started at the time when the mode is changes, the control unit changes the gain according to an exposure period of the readout line, and the control unit performs control so as to cause a period from starting readout of the signal of the predetermined line to starting next readout of the signal of the predetermined line in the first mode to be the same as that from starting readout of the signal of the predetermined line to starting next readout of the signal in the second mode.

9. A method for controlling an imaging apparatus that comprises an imaging unit in which a plurality of photoelectric conversion elements are arranged on a imaging plane; and a control unit which controls the imaging unit, the method comprising:

reading out, by the control unit, imaging signals for one frame in either a first mode in which image signals are read out successively from every predetermined line of a first photoelectric conversion element group arranged in a first region of the imaging plane; or a second mode in which image signals are read out successively from every predetermined line of a second photoelectric conversion element group arranged in a second region which is different from the first region of the imaging plane;

changing, by the control unit, a gain for a frame which is read out after a mode change, based on the ratio between exposure periods of frames before and after the mode change, so as to compensate a difference between exposure periods of frames before and after the mode change;

changing, by the control unit, the gain according to an exposure period of the readout line if a reset of a readout line of a frame to be read out has been started at the time when the mode is changes; and performing, by the control unit, control so as to cause a period from starting readout of the signal of the predetermined line to starting next readout of the signal of the predetermined line in the first mode to be the same as that from starting readout of the signal of the predetermined line to starting next readout of the signal in the second mode.

10. A method for controlling an imaging apparatus that comprises an imaging unit in which a plurality of photoelectric conversion elements are arranged on a imaging plane; and a control unit which controls the imaging unit, the method comprising:

reading out, by the control unit, image signals for one frame in either a first mode in which image signals are read out successively from every predetermined line of a first photoelectric conversion element group arranged in a first region of the imaging plane; or a second mode in which image signals are read out successively from every predetermined line of a second photoelectric conversion element group arranged in a second region which is different from the first region of the imaging plane; and controlling, by the control unit, so as to cause a period from starting readout of the signal of the predetermined line to starting next readout of the signal of the predetermined line in the first mode to be the same as that from starting readout of the signal of the predetermined line to starting next readout of the signal in the second mode, by performing correction for a frame which is read out after a mode change so as to compensate a difference between exposure periods of frames before and after the mode change, wherein, in the controlling step, the control unit does not perform the correction when storage time of the photoelectric conversion elements is below or equal to a predetermined time.

* * * * *